US012356887B2

(12) United States Patent
Ishihira et al.

(10) Patent No.: US 12,356,887 B2
(45) Date of Patent: Jul. 15, 2025

(54) WORKING ROBOT AND CONTROL METHOD

(71) Applicant: YAMABIKO CORPORATION, Tokyo (JP)

(72) Inventors: Haruka Ishihira, Tokyo (JP); Daisuke Ishihira, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 188 days.

(21) Appl. No.: 18/081,071

(22) Filed: Dec. 14, 2022

(65) Prior Publication Data

US 2023/0112518 A1    Apr. 13, 2023

Related U.S. Application Data

(63) Continuation of application No. PCT/JP2021/024379, filed on Jun. 28, 2021.

(30) Foreign Application Priority Data

Aug. 28, 2020  (JP) ................................ 2020-144782

(51) Int. Cl.
*A01D 34/00* (2006.01)
*A01D 101/00* (2006.01)
*G05D 1/00* (2024.01)

(52) U.S. Cl.
CPC .......... *A01D 34/008* (2013.01); *G05D 1/0217* (2013.01); *G05D 1/0225* (2013.01); *A01D 2101/00* (2013.01)

(58) Field of Classification Search
CPC ............. A01D 34/008; A01D 2101/00; G05D 1/0217; G05D 1/0225; G05D 1/0212; Y02T 10/70
See application file for complete search history.

(56) References Cited

U.S. PATENT DOCUMENTS

2019/0171216 A1*  6/2019  Uemoto ............... G05D 1/0276
2019/0187714 A1*  6/2019  He ....................... A01D 34/008
(Continued)

FOREIGN PATENT DOCUMENTS

EP      4089500 A1    11/2022
JP      5973608 B1     8/2016
(Continued)

OTHER PUBLICATIONS

International Search Report & Written Opinion dated Aug. 25, 2021 cited in International Appln. PCT/JP2021/024379.
(Continued)

*Primary Examiner* — Thomas Ingram
(74) *Attorney, Agent, or Firm* — BACON & THOMAS, PLLC

(57) ABSTRACT

A working robot includes a processor. The processor is configured to form a working track along a traveling route for autonomous travel, recognize a location of a charging base configured to charge a battery as a drive source of the working robot, and set a working traveling route in a working section virtually defined and a charging traveling route between as actual location of the working robot and the location of the charging base. Before start of work for one working section, when it is predicted that an amount of charge becomes insufficient halfway through the work in the working section under a set working condition, the processor sets the charging traveling route, and controls traveling along the set charging traveling route.

7 Claims, 13 Drawing Sheets

(56) References Cited

U.S. PATENT DOCUMENTS

| | | | |
|---|---|---|---|
| 2019/0265718 A1* | 8/2019 | Lee | G05D 1/661 |
| 2021/0112708 A1* | 4/2021 | Kameyama | G05D 1/0088 |
| 2021/0232144 A1* | 7/2021 | Lee | H04W 72/23 |

FOREIGN PATENT DOCUMENTS

| | | |
|---|---|---|
| JP | 2018092401 A | 6/2018 |
| JP | 2019107400 A | 7/2019 |
| WO | WO2019187122 A1 | 10/2019 |

OTHER PUBLICATIONS

European Extended Search Report dated Apr. 9, 2024 cited in International Appln. XX.
European Extended Search Report dated Apr. 9, 2024 in Corresponding European Appln. EP 21860957.6.
Office Action cited in corresponding European International Appln. No. 21860957.6 dated Dec. 12, 2024.

* cited by examiner

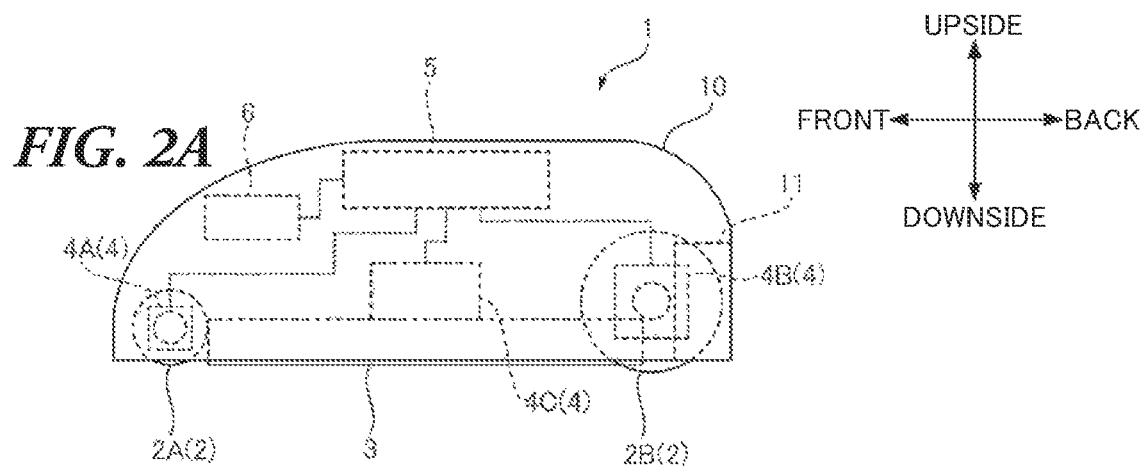
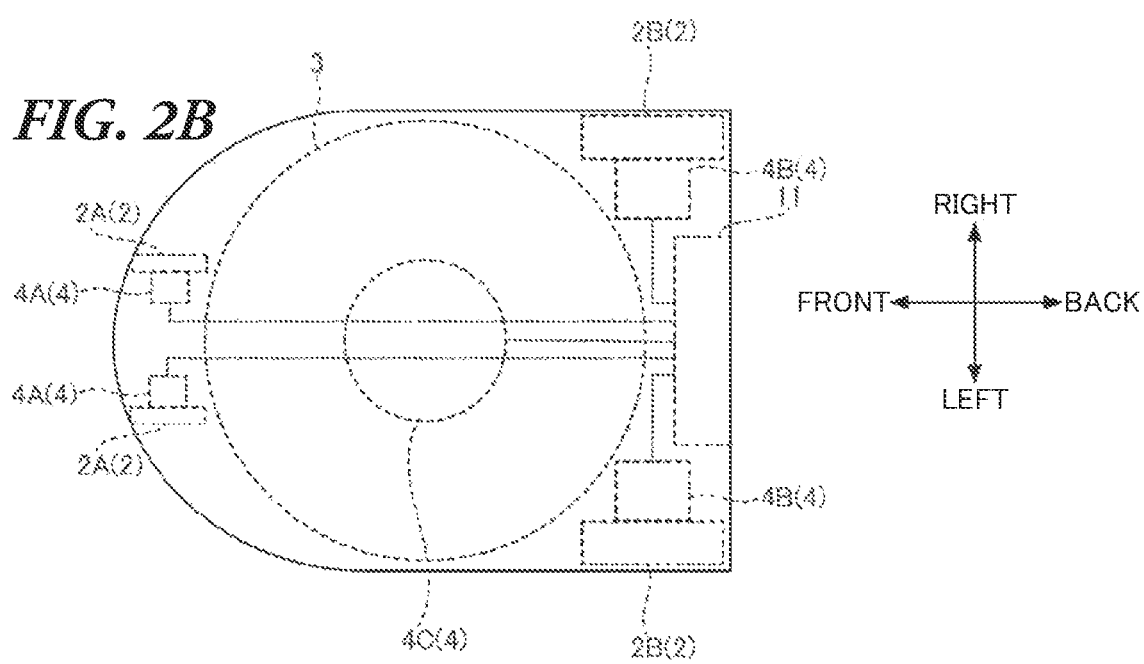

WORKING ROBOT AND CONTROL METHOD

CROSS-REFERENCE TO RELATED APPLICATIONS

The present application is a continuation application of PCT international application No. PCT/JP2021/024379 filed on Jun. 28, 2021 which claims priority from Japanese Patent Application No. 2020-144782 filed on Aug. 28, 2020, and the entire contents of which are hereby incorporated by reference.

BACKGROUND

1. Technical Field

The present invention relates to a controller configured to control the motion of a working robot, and a control method.

2. Related Art

Conventionally, there has been known a working robot configured to perform work such as mowing along a traveling route while autonomously traveling in a working region (see, for example, Japanese Patent No. 5973608). The entire contents of the disclosure are hereby incorporated by reference. The working robot autonomously travels in the set working region, by utilizing a global navigation satellite system such as a GPS, or detecting the reference position of an electronic tag or wire installed in a work site.

SUMMARY

The present invention provides a working robot configured to form a working track along a traveling route for autonomous travel. The working robot includes a processor, and a memory configured to be able to communicate with the processor. The processor is configured to recognize a location of a charging base configured to charge a battery as a drive source of the working robot, and set a working traveling route in a working section virtually defined and a charging traveling route between an actual location of the working robot and the location of the charging base. Before start of work for one working section, when it is predicted that an amount of charge becomes insufficient halfway through the work in the working section under a set working condition, the processor sets the charging traveling route, and controls traveling along the set charging traveling route.

BRIEF DESCRIPTION OF DRAWINGS

FIG. 2A is a side view illustrating the configuration of a working robot;

FIG. 2B is a plan view illustrating the configuration of the working robot;

DETAILED DESCRIPTION

When the working robot performs the work such as mowing, a working track is formed along a traveling route in the working region. For example, when a linear striped working track is formed, the working robot is traveled straight along one direction in the working region to form a straight working track line, and the direction of the working robot is changed at 90 degrees at the edge of the region to move to an undone part of the working region next to the formed track line, and then, the working robot is traveled in the direction opposite to that of the previous working track line. As a result, the straight working track lines which are parallel to each other and have working directions different from each other are formed.

In the case where the working track is formed in the working region as described above, when the work is halted due to insufficient charge, the working robot needs to be moved to a charging base once. Therefore, the working track is discontinued, and this makes it difficult to form a working track with good appearance.

For example, in the case where a linear striped working track is formed, when the working robot is moved to the charging base for the charging halfway through the work, the direction of the returned working robot and the position to resume the work must be precisely controlled to ensure the continuity of the linear striped working track. To address this, it is tried to attain the continuity of the working track while the working robot is charged halfway through the work. This causes a problem with increasing the control load of the working robot.

The present invention has been achieved to solve the above-described problem. That is, it is therefore an object of the invention to form the working track with good appearance while reducing the control load when the working robot forms the working track in the set working region.

Hereinafter, an embodiment of the present invention will be described with reference to the drawings. The same reference numbers in the different drawings indicate the same functional parts, and therefore repeated description for each of the drawings is omitted.

Figure 1:
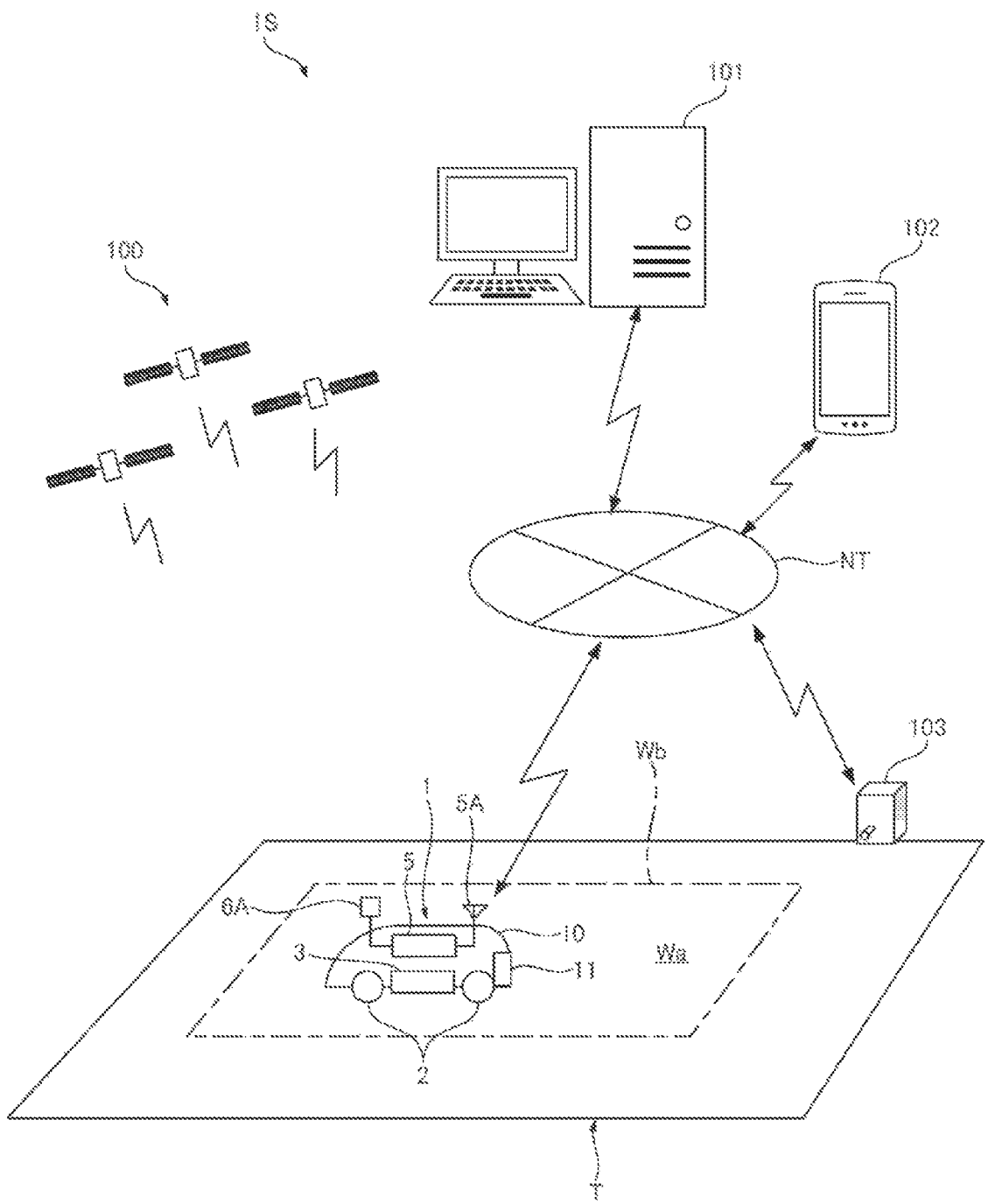
FIG. 1 illustrates the entire configuration of a working robot system.

As illustrated in FIG. 1, a working robot system 1S is constituted by a working robot 1, and management equipment configured to manage the working robot 1. The management equipment includes a server 101, a mobile information terminal 102 belonging to a user, and a charging base 103, and each of them can transmit and receive signals to and from the working robot 1 via a network NT.

The controller is configured to control the working robot 1 in the working robot system 1S. The source of control signals may be provided in any of the working robot 1, the server 101, the mobile information terminal 102, and the charging base 103.

The working robot 1 includes a machine 10 and a traveling device 2 configured to be able to autonomously travel. The machine 10 includes a working device 3 configured to perform work along the traveling route of the machine 10. In addition, the working robot 1 includes a processor 5 configured to control the traveling device 2 and the working device 3. A communication device 5A configured to transmit and receive signals to and from the management equipment via the network NT is connected to the processor 5.

As an example, a GNSS (Global Navigation Satellite System) sensor 6A configured to receive a radio signal transmitted from a GNSS satellite 100 is connected to the processor 5, in order to detect the actual location of the machine 10 by utilizing a GNSS such as a GTS. In this case, by adopting an RTK-GPS system, the radio signal is received in a place such as the fixed charging base 103 to determine the location of the working robot 1, and therefore it is possible to more accurately measure the location of the moving working robot 1.

FIG. 2 illustrates an example of the configuration of the working robot 1. The traveling device 2 of the illustrated working robot 1 includes front wheels 2A and rear wheels 2B. The traveling device 2 can allow the machine 10 to autonomously travel toward any direction in a working region Wa set in a work site as illustrated in FIG. 1. The working region Wa illustrated in FIG. 1 is defined by a work boundary Nb. The work boundary Nb is formed by a virtual line which can be recognized by the working robot 1 on map information, or a wire line which can be physically sensed by the working robot 1.

The machine 10 of the working robot 1 includes a driving device 4 configured to drive the traveling device 2 and the working device 3. With the example illustrated in FIG. 2, the driving device 4 includes a pair of right and left front wheel driving parts 4A and a pair of right and left rear wheel driving parts 4B, and also includes a working device driving part 4C configured to drive the working device 3. In addition, the working robot 1 includes a battery 11 as a power source for the driving device 4 and the processor 5.

The working device 3 of the working robot 1 is configured to perform work such as mowing work, dispersion work, and collection work, so that a working track is formed along the traveling route of the machine 10. Hereinafter, as an example, the working device 3 performing the mowing work will be described. With the example illustrated in FIG. 2, the working device 3 has a circular working range in a plane view, and mows grass lust under the working device 3 by rotating a mowing blade (not illustrated) around a vertical axis. When this working device 3 is driven while the machine 10 is traveling, the working track through which the mowing work is done is formed along the traveling route of the working robot 1. The width of the working track is the diameter of the circular working range of the working device 3 in a plane view.

The machine 10 of the working robot 1 includes a sensor 6. The sensor 6 includes various detectors such as the GNSS sensor 6A to allow the traveling device 2 to autonomously travel or to control the driving of the working device 3. The sensor 6 is provided in the front part of the machine 10, and a detection signal from the sensor 6 is transmitted to the processor 5.

Figure 3:
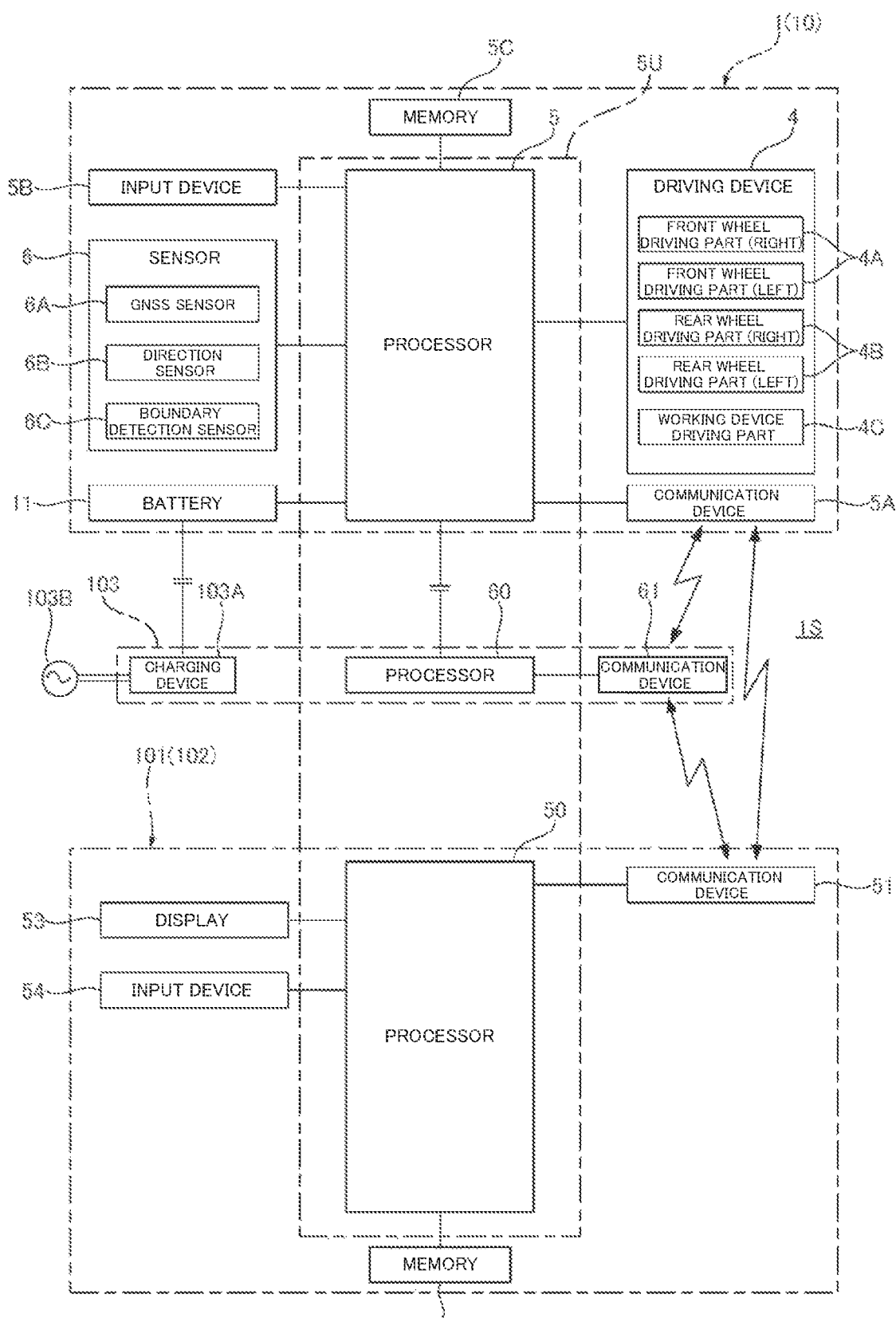
FIG. 3 illustrates a controller for the working robot.

FIG. 3 is a block diagram illustrating an example of the configuration of the working robot system 1S. The driving device 4, the sensor 6, and the battery 11 are connected to the processor 5 of the working robot 1. Also, the communication device 5A, an input device 5B configured to input information to the processor 5, and a memory 5C configured to store the information inputted to the processor 5 are communicably connected to the processor 5 of the working robot 1.

The sensor 6 includes the GNSS sensor 6A, a direction sensor 6B configured to detect the traveling direction of the machine 10, and a boundary detection sensor 6C configured to physically detect an electronic tag or wire installed at the position of the work boundary.

The server 101 includes a processor 50. A communication device 51 configured to connect the server 101 to the network NT, an input device 54 configured to input information to the processor 50, a memory 52 configured to store the information inputted to the processor 50, and a display 53 configured to display the control state of the processor 50 or the processor 5 are connected to the processor 50. Here, the mobile information terminal 102 belonging to the user has a function equivalent to that of the server 101.

The charging base 103 includes a charging device 103A connected to the battery 11. The charging device 103A converts, for example, commercial alternating-current power 103B into direct-current power and charges the battery 11. In addition, the charging base 103 may include a processor 60 and a communication device 61 connected to the processor 60.

The communication device 5A of the working robot 1, the communication device 51 of the server 101 or the mobile information terminal 102, and the communication device 61 of the charging base 103 are connected to each other via the network NT. Therefore, the processor 5 of the working robot 1, the processor 50 of the server 101 or the mobile information terminal 102, and the processor 60 of the charging base 103 can transmit and receive signals (information) to and from each other, and constitute one unified controller 5U.

Figure 4:
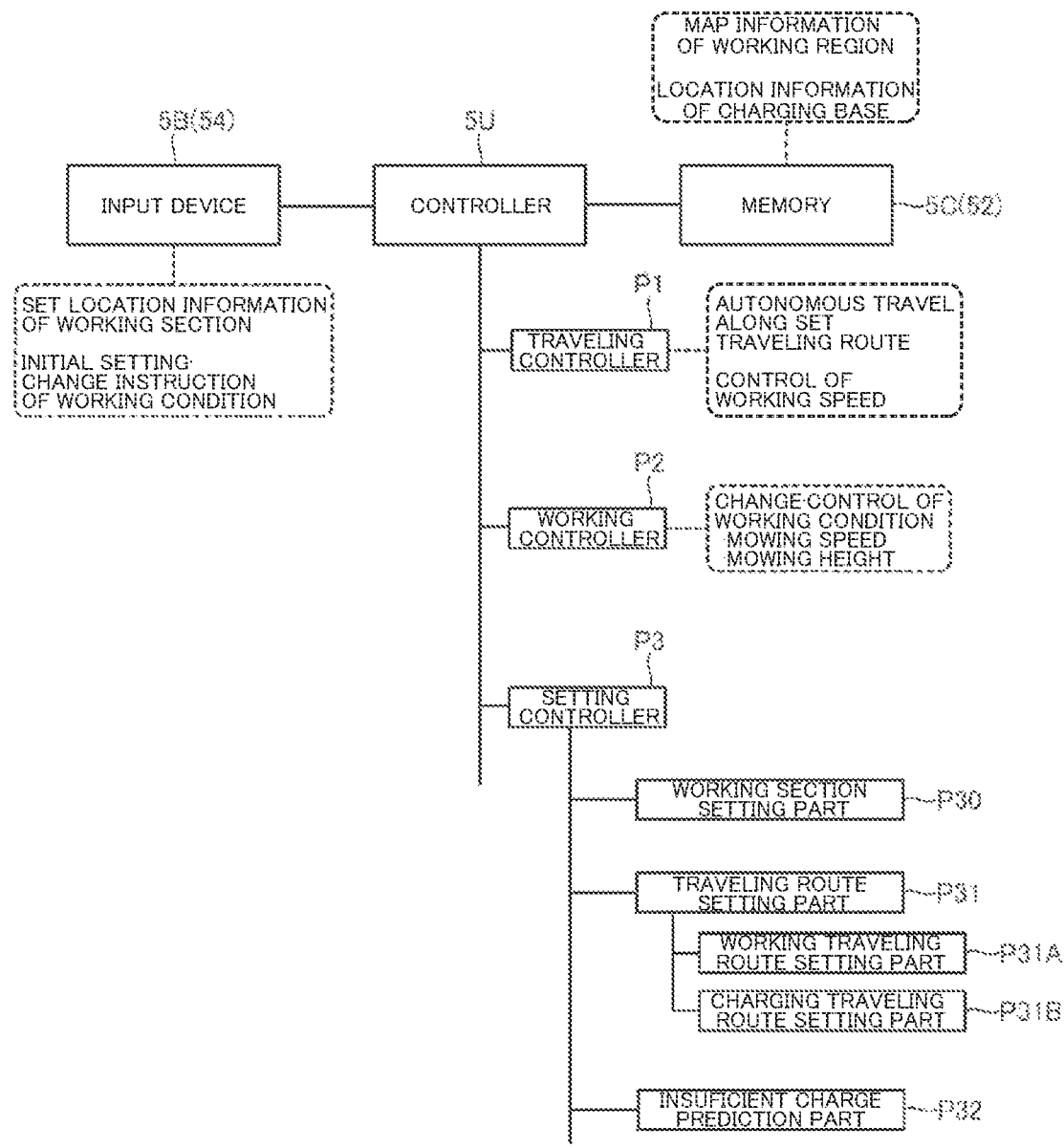
FIG. 4 illustrates control functions (programs) of the controller for the working robot.

The control of the working robot system 1S is executed by incorporating a program having a function illustrated in FIG. 4 into the controller 5U. Part or the whole of the programs executed by the controller 5U can be incorporated into the processor 5 of the working robot 1, the processor 50 of the server 101 or the mobile information terminal 102, and the processor 60 of the charging base 103. Here, among the management equipment such as the server 101, the mobile information terminal 102 and the charging base 103, the management equipment without the program essential to the working robot system 1S may be omitted accordingly. Each of the processors 5, 50, and 60 reads the program stored in the memory 5C or 52 and can execute processing, or may include a circuit configured to be able to execute the processing.

The controller 5U includes a traveling controller P1, a working controller P2, and a setting controller P3 as control functions incorporated as programs (software), and performs various kinds of control by utilizing the information inputted from the input device 5B(54) and the information stored in the memory 5C(52).

Set position information of the working section, information of the initial setting of a working condition, and information of an instruction to change the working condition are inputted from the input device 5B(54). Map information of the working region Wa, and location information of the charging device base 103 are stored in the memory 5C(52). By acquiring these pieces of information, the controller 5U knows the locations in the working region Wa, and the location of the charging base 103 with respect to the locations in the working region Wa.

The traveling controller P1 of the controller 5U controls the front wheel driving part 4A and the rear wheel driving part 4B of the working robot 1 to allow the working robot 1 to autonomously travel along the traveling route set by the setting controller P3. In addition, the traveling controller P1 controls the front wheel driving part 4A and the rear wheel driving part 4B to control the working speed (traveling speed) of the working robot 1.

The working controller P2 of the controller 5U controls the working device driving part 4C of the working robot 1 to control the working device 3 under the working condition which is initially set by the input from the input device 5B(54). In addition, the working controller P2 controls the working device 3 depending on the working condition changed in response to the instruction to change the working condition inputted by the input device 5B(54), or the setting by the setting controller P3. When the working device 3 is a mowing work device, the working condition includes the mowing speed and the mowing height.

The setting controller P3 of the controller 5U includes at least a working section setting part P30, a traveling route setting part P31, and an insufficient charge prediction part P32.

The working sections set by the working section setting part P30 are subregions which are virtually defined in the working region Wa. A continued (uninterrupted) working rack is formed in one working section. The working section setting part P30 sets one or more working sections based on, for example, the set position information indicating the positions at which the working sections are set in the working region Wa. One working section may be set every time the work is started, or a plurality of working sections may be set, for example, by dividing the working region Wa into a plurality of sections before the work is started.

The traveling route setting part P31 is configured to set the traveling route for the autonomous travel of the working robot 1, and includes a working traveling route setting part P31A configured to set the traveling route in the working section after the working section is set, and a charging traveling route setting part P31B configured to set the traveling route between the actual location of the working robot 1 and the charging base 103.

Figure 5A:
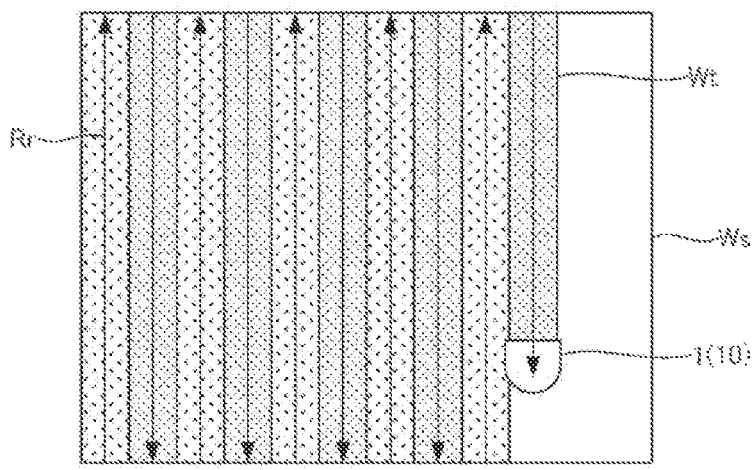
FIG. 5A illustrates a working mode of a working track as a linear striped track.
Figure 5B:
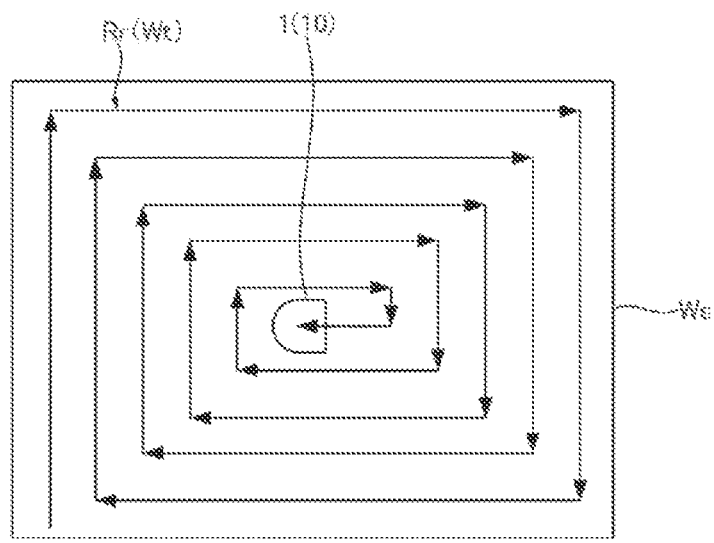
FIG. 5B illustrates a working mode of the working track as a turning striped track.
Figure 5C:
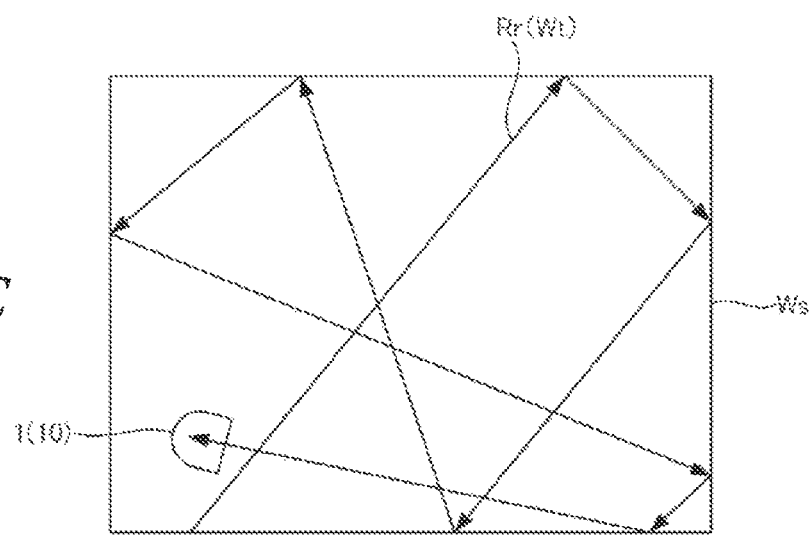
FIG. 5C illustrates a working mode of the working track as a random track.

The working traveling route setting part P31A sets the traveling route to form the working track in the working section. As illustrated in FIGS. 5A to 5C, a working track Wt is formed along a traveling route Rr in each of the working section Ws, and may be set in a plurality of working modes. The working modes includes, for example, a linear striped track where the traveling directions of adjacent straight track lines are alternately changed as illustrated in FIG. 5A; a turning striped track to go straight and turn at 90 degrees as illustrated in FIG. 5B (here, the turning from the inside to the outside may be selected, as well as the turning from the outside to the inside as illustrated); and a random track to go straight while randomly changing the traveling direction at edges of the working section as illustrated in FIG. 5C.

The charging traveling route setting part P31B sets the traveling route to shuttle between the actual location of the working robot 1 and the charging base 103. As examples, a shortest distance route obtained by connecting the actual location of the working robot 1 and the charging base 103 to one another by a straight line, and a bypass route to bypass an obstacle (impeditive facility) whose location is known and the working section where the work has been finished, are set appropriately.

Before the work for one working section is started, insufficient charging prediction part P32 predicts whether the amount of charge is insufficient halfway through the work in this working section under the set working condition. In this case, a remaining amount of battery R is detected at the time of the prediction, and an amount of consumption of battery C for the next working sect-ion is calculated. Then, when C is greater than R, it is predicted that the amount of charge becomes insufficient halfway through the work, and, on the other hand, when C is equal to or smaller than R, it is predicted that the work in the working section can be finished. Here, simply, when the remaining amount of battery R is smaller than a set threshold without calculating the amount of consumption of battery C, it may be predicted that the amount of charge becomes insufficient halfway through the work.

As one aspect of the control for the case where the insufficient charge prediction part P32 predicts that the amount of charge becomes insufficient halfway through the work, the charging traveling route setting part 31A of the traveling route setting part P31 sets the traveling route Rr (see FIG. 11) between the actual location of the working robot 1 and the location of the charging base 103, and the traveling controller P1 controls to allow the working robot 1 to autonomously travel along the set traveling route Rr.

On the other hand, when the insufficient charge prediction part P32 predicts that the work in the working section can be finished, the traveling controller P1 controls to allow the working robot 1 to autonomously travel along the traveling route Rr set by the working traveling route setting part P31A of the traveling route setting part P31 to form the working track Wt in the working section (see FIG. 5).

As another aspect of the control for the case where the insufficient charge prediction part P32 predicts that the amount of charge becomes insufficient halfway through the work, it is determined whether the work in the working section can be finished by changing the working condition. To be more specific, in the case where the working device 3 is a mowing work device, one or both of the mowing speed and the mowing height of the working condition is changed to reduce the battery consumption, and the amount of battery consumption C for the work to the end of the traveling route in the working section is calculated, based on the changed working condition. Then, when the working condition can be changed such that C is equal to or smaller than R, the working controller P2 controls to change the working condition. After that, the working robot 1 autonomously travels along the traveling route Rr set by the working traveling route setting part P31A to form the working track Wt along the traveling route Rr in the working section (see FIG. 5).

FIG. 6 to FIG. 9 illustrate examples of the control flow of the controller 5U. With the examples illustrated in FIG. 6 and FIG. 7, a working section is set individually for each work. With the example illustrated in FIG. 6, after the start of the control, the working condition is set or inputted (step S01), and the working section setting part P30 sets a working section (step S02). Then, the working traveling route setting part P31A sets a working traveling route based on the set working section (step S03). In this case, the working mode is selected in order to form a desired working track.

After the working traveling route in the working section is set, the insufficient charge prediction part P32 predicts whether the amount of charge becomes insufficient halfway through the work in the working section based on the set working condition (step S04). Here, when the insufficient charge prediction part P32 predicts that the amount of charge becomes insufficient (predicts insufficient charge) (step S04:

YES), the charging traveling route setting part P31B sets a charging traveling route (step S05).

After the charging traveling route is set, the traveling controller P1 controls to travel to the charging base (step S06), and the battery 11 of the working robot 1 is charged in the charging base 103 (step S07: NO). After determining that the charging is completed (step S07: YES), the traveling controller P1 controls to travel to the next working section along the set charging traveling route (step S08).

After the step S08, or when the insufficient charge prediction part P32 predicts that the amount of charge does not become insufficient in the working section (predicts sufficient charge) (step S04: NO), the work in the working section is performed under the set working condition (step S09), so that the working track in the selected working mode is formed in the working section. After that, when it is determined to continue the work (step S10: YES), the step is returned to the step S01 and the steps are repeated. On the other hand, when it is determined not to continue the work (step S10: NO), the control is ended.

Figure 6:
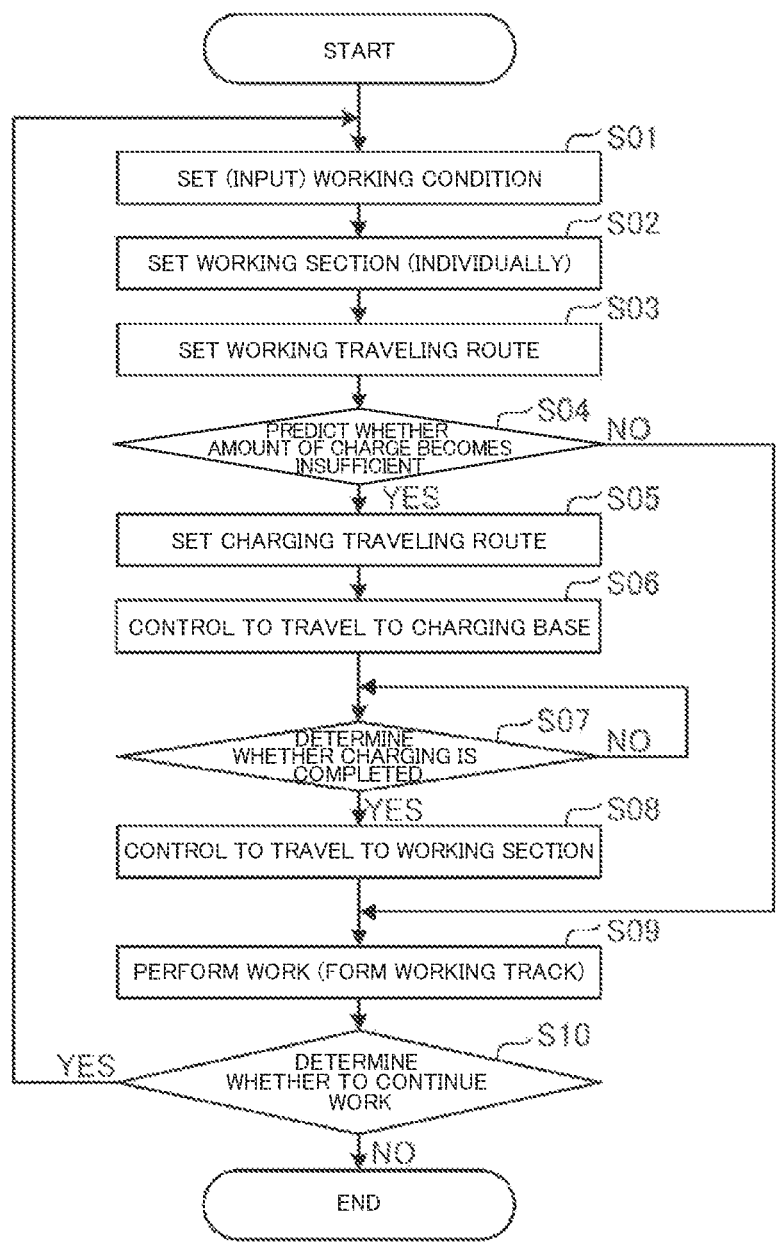
FIG. 6 illustrates an example of control flow of the controller for the working robot.
Figure 7:
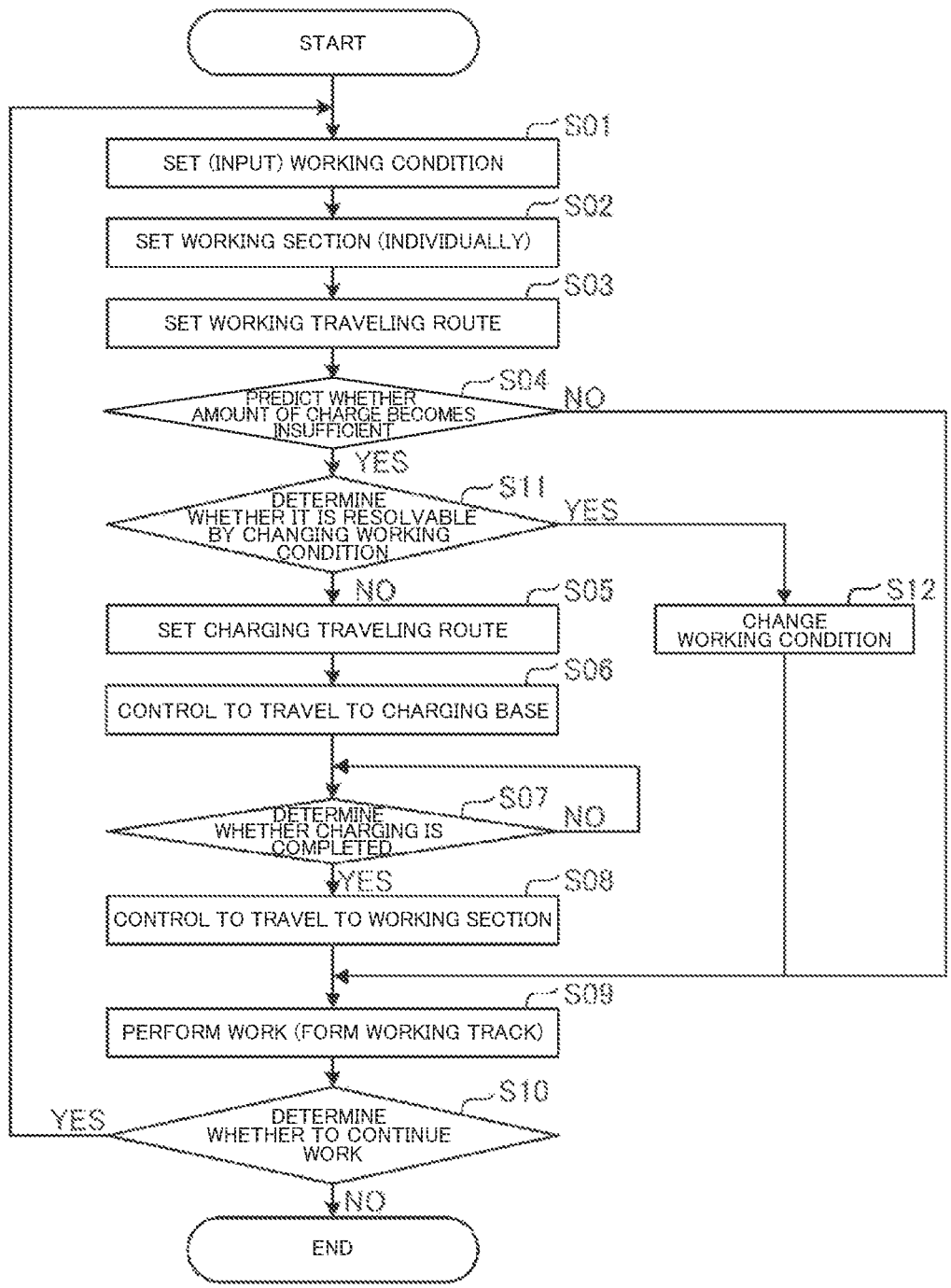
FIG. 7 illustrates an example of control flow of the controller for the working robot.

With the example illustrated, in FIG. 7, the step S01 to the step S10 are the same as those of FIG. 6. With the example illustrated in FIG. 7, when predicting that the amount of charge becomes insufficient halfway through the work in the working section (predicts insufficient charge) (step S04: YES), the insufficient charge prediction part P32 determines whether it is resolvable by changing the working condition (step S11).

In the step S11, it is determined whether the work in the working section can be finished by changing the working condition as described above. To be more specific, it is determined whether the work in the working section can be finished by changing one or both of the mowing speed and the mowing height of the working condition to reduce the battery consumption. Here, when it is determined that it is resolvable (step S11: YES), the working controller P2 changes the working condition (step S12), and the work is performed in the step S09. When it is determined that it is not resolvable (step S11: NO), the charging traveling route is set, and the step S05 to the step S10 illustrated in FIG. 6 are executed.

Figure 8:
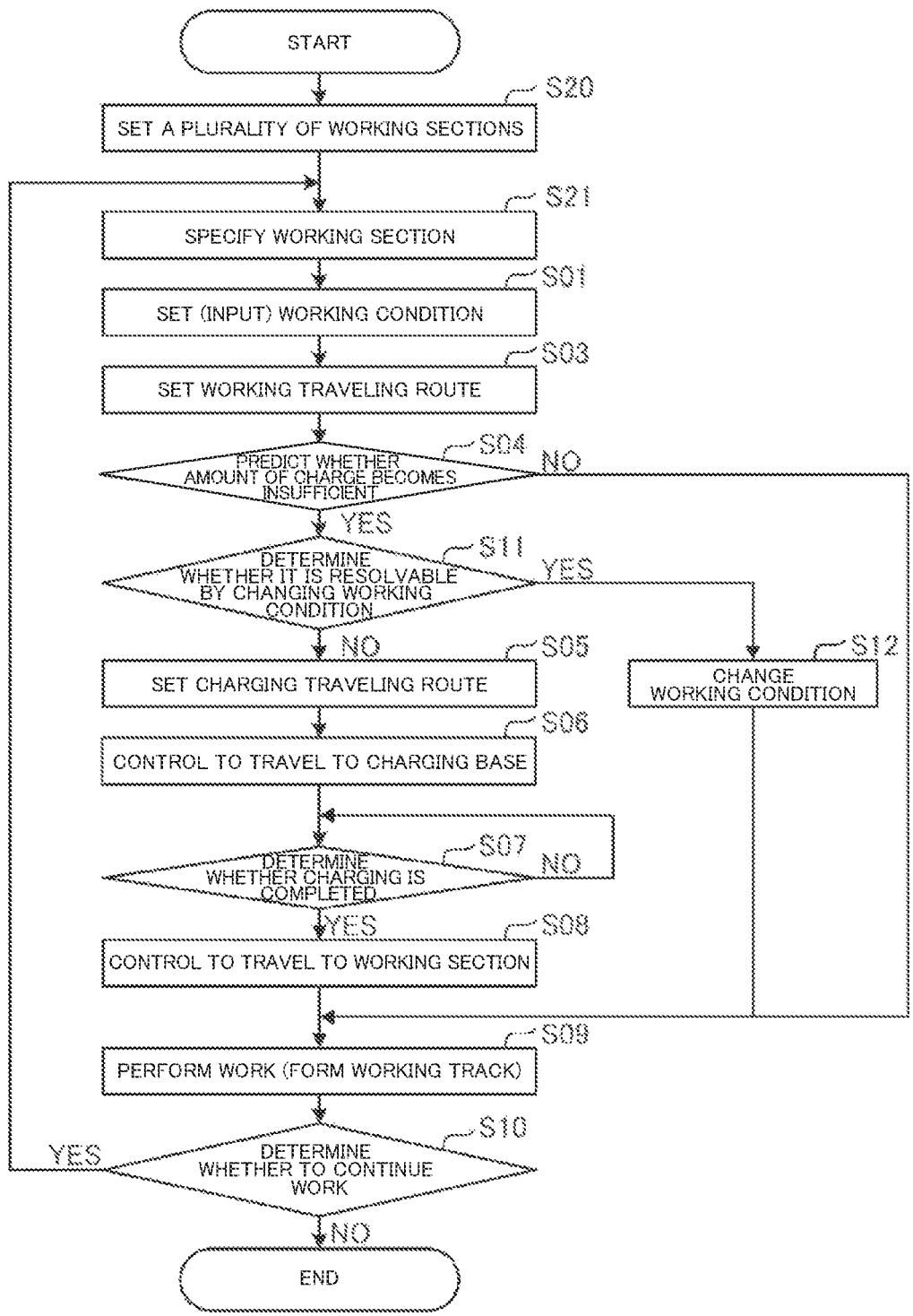
FIG. 8 illustrates an example of control flow of the controller for the working robot.

With the example illustrated in FIG. 8, step S20 and step S21 are provided instead of the step S02 illustrated in FIG. 7. That is, with the example illustrated in FIG. 8, after the start of the control, the working section setting part P30 sets a plurality of working sections (step S20), and the traveling route setting part P31 specifies one of the set working sections (step S21), and sets the working traveling route in the specified working section (step S03).

With the example illustrated in FIG. 8, the step S01, the step S03 to the step S10, the step S11, and the step S12 are the same as those of FIG. 7. Here, the step S11 and the step 12 may be omitted from the control flow. With the example illustrated in FIG. 8, when it is determined to continue the work in the step S10 (step S10: YES), another (undone) working section of the set working sections is newly specified in the step S21.

Figure 9:
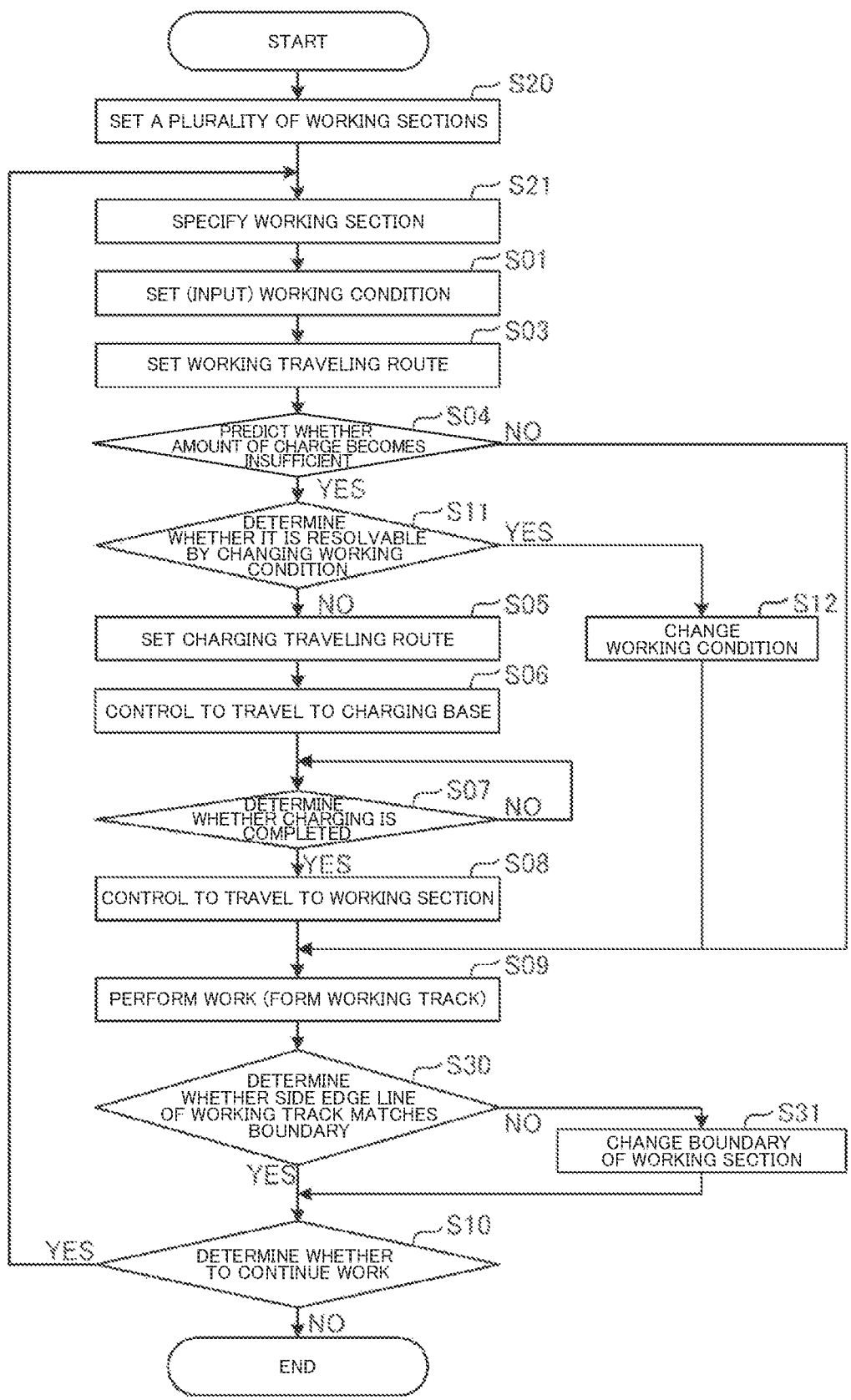
FIG. 9 illustrates an example of control flow of the controller for the working robot.

With the example illustrated in FIG. 9, step S30 and step S31 following the step S09 are added to the example illustrated in FIG. 6. In this example, the step S20 and the step S21 may be substituted for the step S02 as the example illustrated in FIG. 6. In addition, in the example, the step S11 and the step S21 may be omitted.

Figure 10:
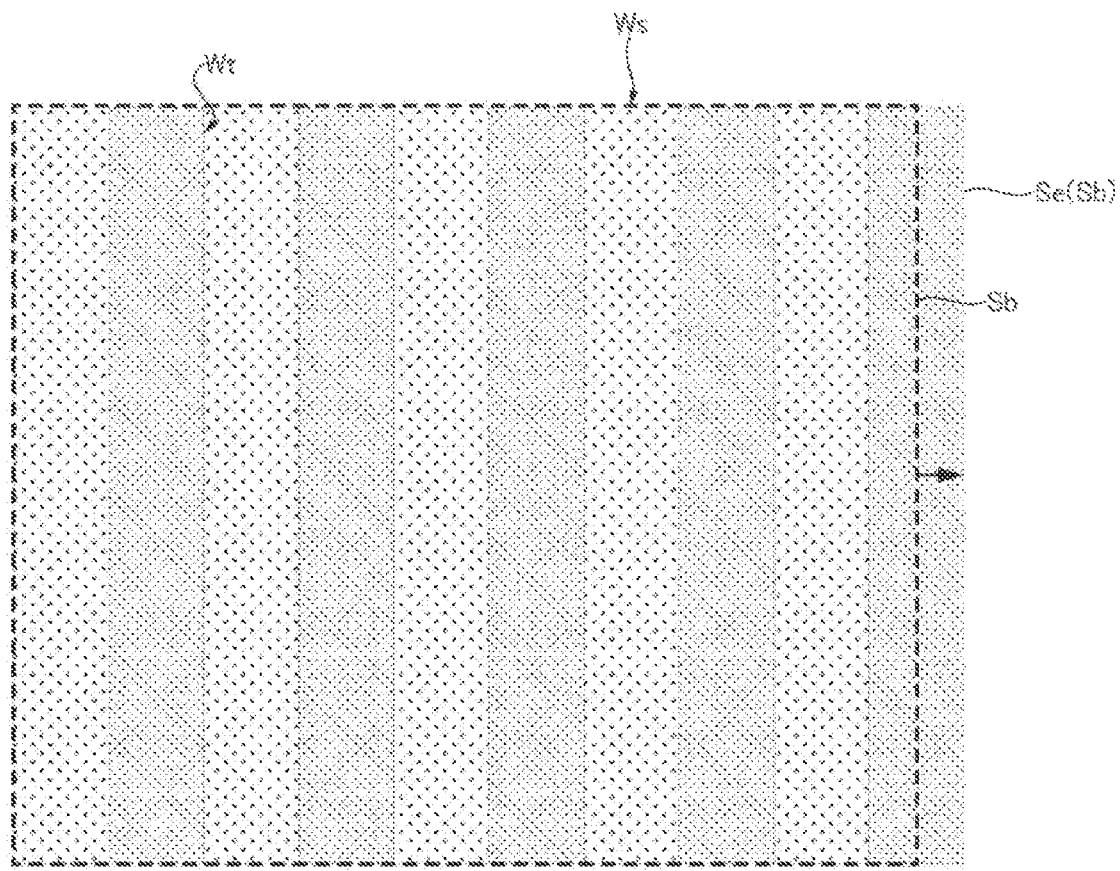
FIG. 10 illustrates step S30 and step S31 of FIG. 9.

With the example illustrated in FIG. 9, in the step S30, it is determined whether the side edge line of the working track finally formed for the working section matches the boundary of the working section. As illustrated in FIG. 10, when the working robot 1 forms, for example, the linear striped working track Wt which is formed for the working section Ws, a side edge line Se of the working track Wt which is formed by the working width of the working device 3 may not match a boundary Sb of the working section Ws. In this case, the boundary Sb of the working section Ws is changed to match the side edge line Se of the working track Wt with the boundary Sb of the working section Ws. By this means, the line widths of the linear striped working track Wt formed in the working section Ws are neatly arranged, and therefore it is possible to form the working track Wt with better appearance. Here, the boundary Sb of the working section Ws which is changed co match the side edge line Se becomes the boundary Sb of the adjacent working section Wt, and is reflected when the working traveling route is set in the adjacent working section Ws.

Figure 11:
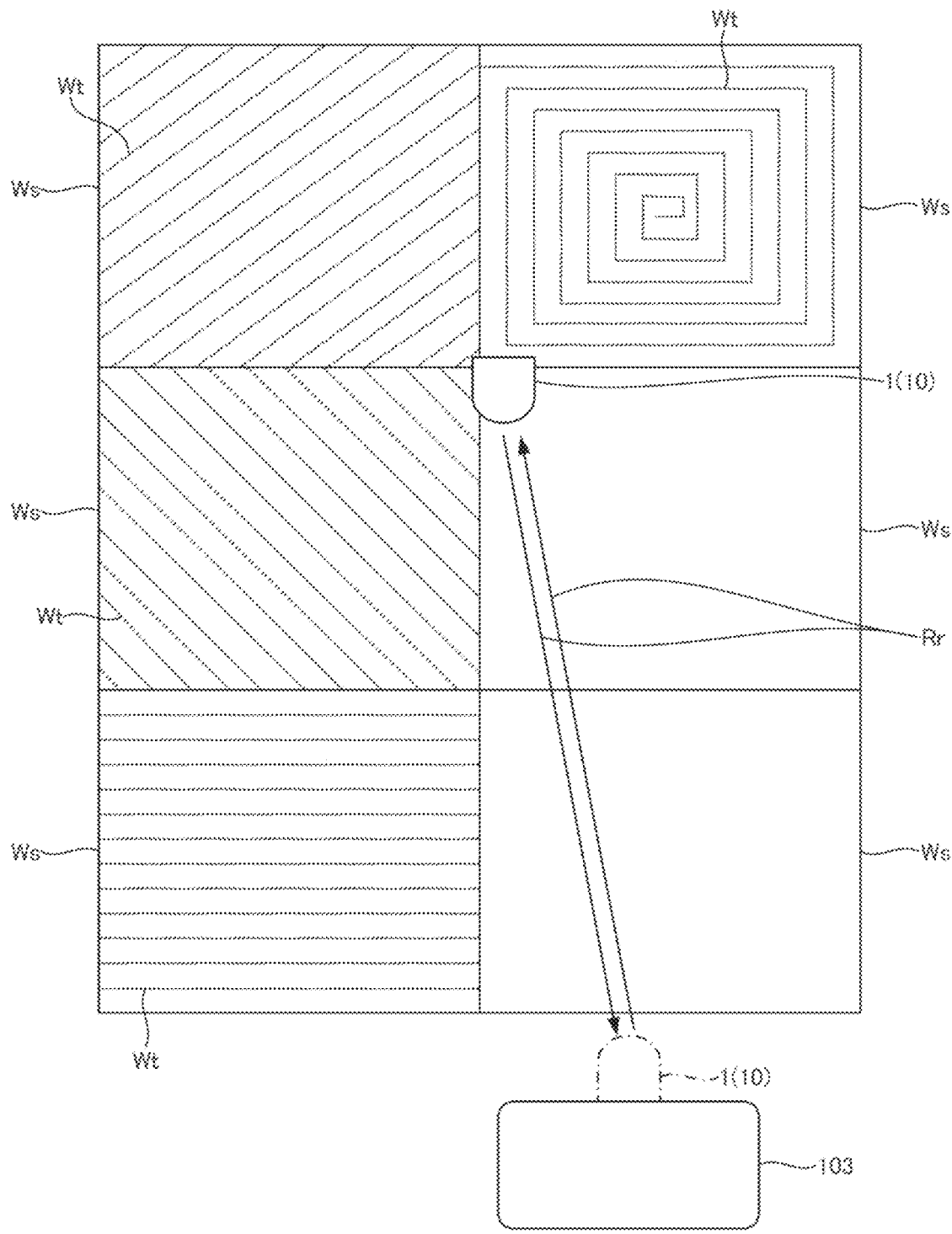
FIG. 11 illustrates a basic motion of the working robot.

FIG. 11 illustrates a basic motion of the working robot 1 controlled by the controller 5U. The working robot 1 forms the working tracks Wt in the set working sections Ws in desired working modes. As illustrated, the working track Wt may be varied for each of the working sections Ws, or the working tracks Wt may be the same as each other for the working sections Ws. Also, the working condition can be set to vary for each of the working sections Ws. In this case, when there is a working section Ws where the workload of the mowing is large, for example, where long grass grows thickly, it is possible to individually set an appropriate working condition, for example, to reduce the mowing speed, to the working section Ws with the large workload.

In addition, before the working robot 1 performs the work for each of the working sections Ws, it is predicted whether the amount of charge is insufficient as described above. Then, in the case where it is predicted that the amount of charge is insufficient halfway through the work in the next working section Ws under the set working condition, when it is not resolvable by changing the working condition, the working robot 1 is moved to the charging base 103, and after being charged, moved to the entrance of the next working section Ws.

Figure 12:
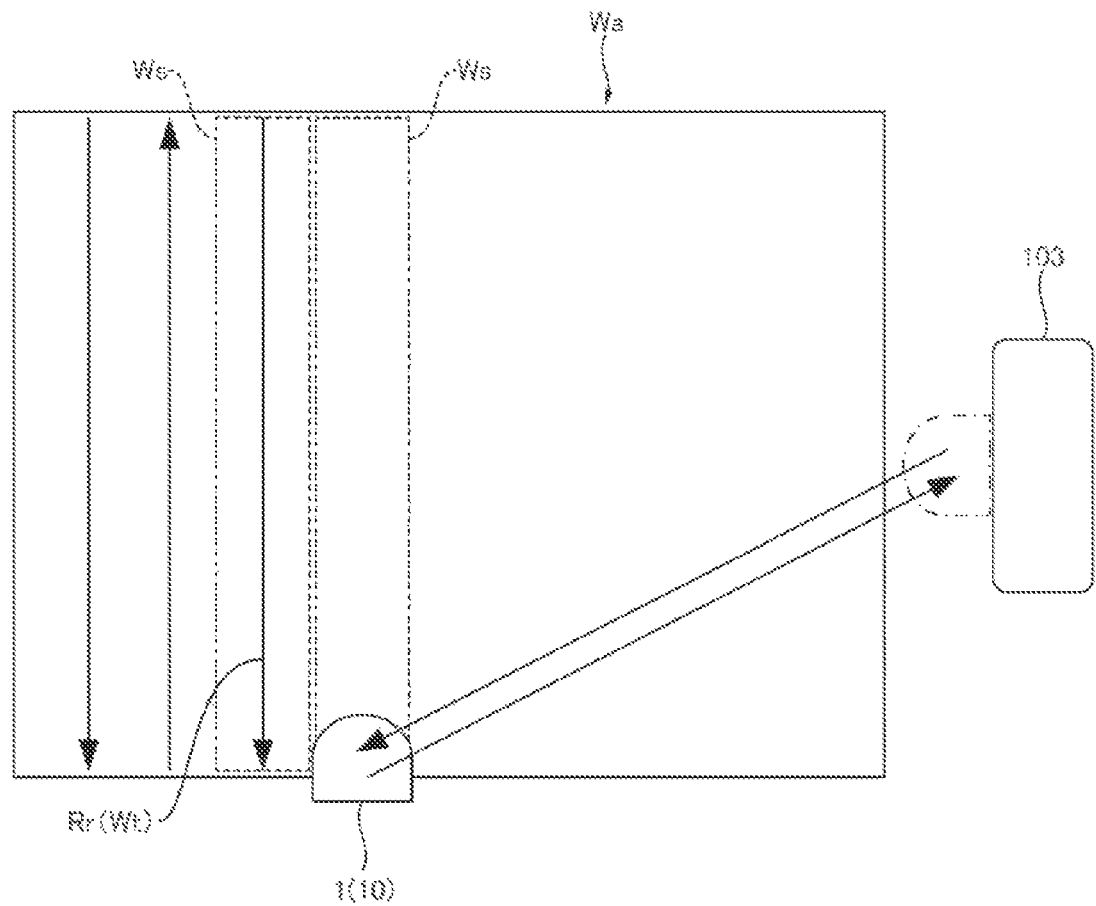
FIG. 12 illustrates an example of setting working sections.
Figure 13:
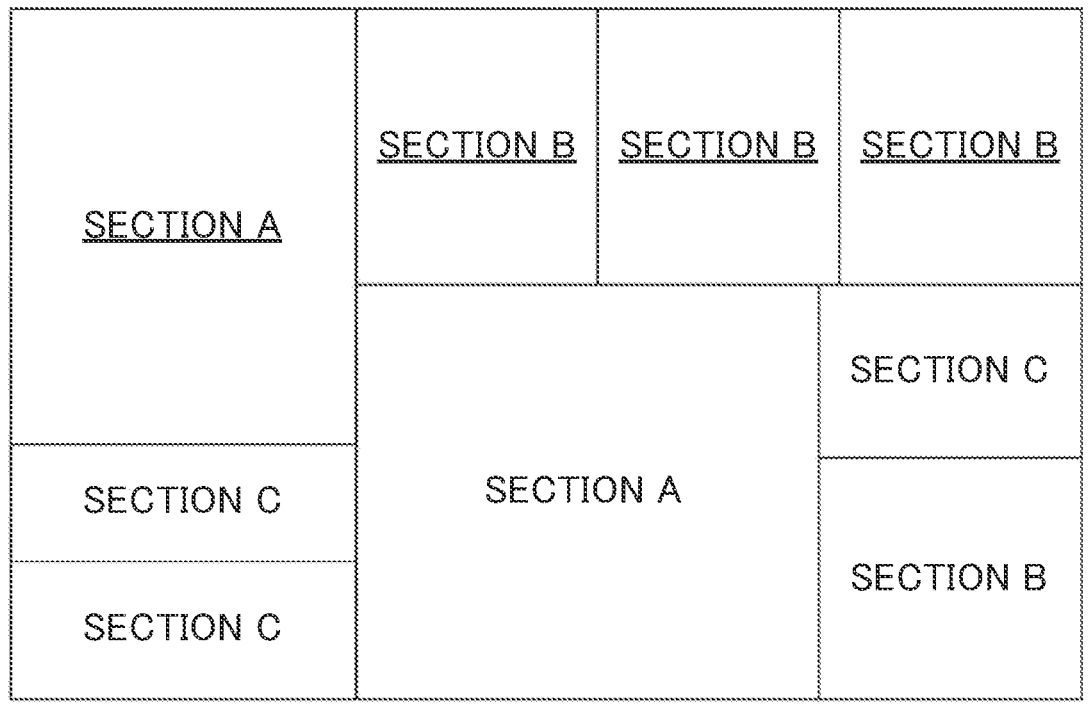
FIG. 13 illustrates an example of setting working sections.

FIG. 12 and FIG. 13 illustrate examples of setting working sections. With the example illustrated in FIG. 12, when a linear striped working track Wt is formed in a working region Wa, a section including one straight track line is set as a working section Ws. With this example, the working section Ws is set for each one of the straight track lines, and therefore it is predicted whether the amount of charge is insufficient as described above before the start of the work for one straight track line. Then, in the case where it is predicted that the amount of charge is insufficient halfway through the work on the next straight track line under the set working condition, when it is not resolvable by changing the working condition, the working robot 1 is moved to the charging base 103, and after being charged, performs the work on the next straight track line.

With the example illustrated in FIG. 13, working sections are categorized and set as a plurality of groups to enable the scheduling to select the optimum working section for the work. With the illustrated example, the working sections are categorized into "section A" having an area or workload for which the work for one section can be finished by one charge; "section B" having an area or workload for which the work for two sections can be finished by one charge; and "section C" having an area or workload for which the work for three sections can be finished by one charge.

In this way, the working sections are categorized, and the working robot 1 is charged after the work for one working section of "section A" is finished; the working robot 1 is charged after the work for two working sections of "section B" are finished; and the working robot 1 is charged after the work for three working sections of "section C" are finished. By this means, it is possible to avoid charging when the amount of charge remains halfway, and to provide the optimal scheduling for efficient work with appropriate number of times of charging.

As described above, according to the controller 5U of the working robot 1 of the embodiment of the invention, or the control method by the controller 5U, the location of the charging base 103 configured to charge the battery 11 as the drive source of the working robot 1 is recognized; the traveling route in the working section Ws virtually defined, and the traveling route between the working section Ws and the charging base 103 are set; and before the start of the work for one working section Ws, when it is predicted that the amount of charge is insufficient halfway through this working section Ws, the traveling route to move to the charging base 103 is set, or the working condition is changed. By this means, it is possible to avoid stopping the work halfway to charge the battery, and form the working track with good appearance in the set working section Ws while reducing the control load.

According co the invert ion having the above-described feature, it is possible to avoid stopping the work halfway to charge the battery when the working robot forms the working track in the set working region, and therefore to form the working track with good appearance while reducing the control load.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A working robot configured to form a working track along a traveling route for autonomous travel, the working robot comprising:
   a processor; and
   a memory configured to be able to communicate with the processor,
   the processor being configured to recognize a location of a charging base configured to charge a battery as a drive source of the working robot, and set a working traveling route in a working section virtually defined and a charging traveling route between an actual location of the working robot and the location of the charging base,
   wherein, before start of work for one working section, when it is predicted that an amount of charge becomes insufficient halfway through the work in the working section under a set working condition, the processor sets the charging traveling route, and controls traveling along the set charging traveling route.

2. The working robot according to claim 1, wherein the working section is a section for which one straight track line constituting a linear striped working track is formed.

3. The working robot according to claim 2, wherein the processor is configured to change a boundary of the working section to match a side edge line of the working track with the boundary of the working section.

4. The working robot according to claim 1, wherein the working track can be selected from a plurality of working modes.

5. The working robot according to claim 1, wherein:
   the processor is configured to control a mowing work device configured to form the working track; and
   before the start of the work for the one working section, the processor sets the working condition such that the work is the one working section can be finished.

6. The working robot according to claim 5, wherein the working condition includes one or both of a mowing speed and a mowing height.

7. A control method for a working robot configured to form a working track along a traveling route for autonomous travel, the control method comprising:
   recognizing a location of a charging base configured to charge a battery as a drive source of the working robot; and
   setting a traveling route in a working section virtually defined, and a traveling route between the working section and the charging base,
   wherein before start of work for one working section, when it is predicted that an amount of charge becomes insufficient halfway through the work in the working section, a traveling route to move to the charging base is set.

* * * * *